United States Patent

Metsker

[15] 3,637,252
[45] Jan. 25, 1972

[54] VEHICLE BODY CONSTRUCTION
[72] Inventor: William E. Metsker, Tulsa, Okla.
[73] Assignee: Avco Corporation, Tulsa, Okla.
[22] Filed: Mar. 27, 1970
[21] Appl. No.: 23,369

[52] U.S. Cl..............................296/31 P, 52/309, 105/238, 105/404
[51] Int. Cl..............................................B62d 29/04
[58] Field of Search..................296/31 R, 31 P, 28 M, 28 R, 296/23 R, 23 MC; 52/309; 105/404

[56] References Cited

UNITED STATES PATENTS

| | | | |
|---|---|---|---|
| 3,084,973 | 4/1963 | Beckley | 296/31 P |
| 3,302,362 | 2/1967 | Lang | 52/309 X |
| 3,327,441 | 6/1967 | Kelly | 296/31 X |
| 3,432,979 | 3/1969 | Heimann | 52/309 |
| 3,297,355 | 1/1967 | Robinson | 296/23 MC |

Primary Examiner—Benjamin Hersh
Assistant Examiner—John A. Pekar
Attorney—Charles M. Hogan and Gary M. Gron

[57] ABSTRACT

The disclosure illustrates a vehicle body comprising a tubular cage-type frame over which a reinforced glass fiber outer shell is secured by means of a polyester adhesive. Rigid urethane foam material fills the recesses formed on the inside of the reinforced glass fiber shell by the tubular frames to structurally interconnect and reinforce the frame and the outer shell. A pair of unitary ceiling panels and a series of vertical sidewall panels are secured to the frame members. The vehicle body is used for a self-propelled vehicle by securing the tubular frame to the vehicle chassis.

9 Claims, 6 Drawing Figures

INVENTOR.
WILLIAM E. METSKER
BY Charles M. Hogan
Gary M. Gron
ATTORNEYS.

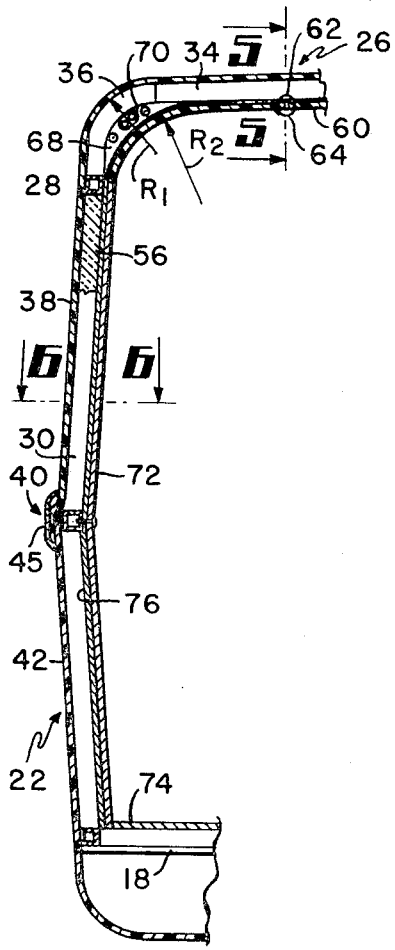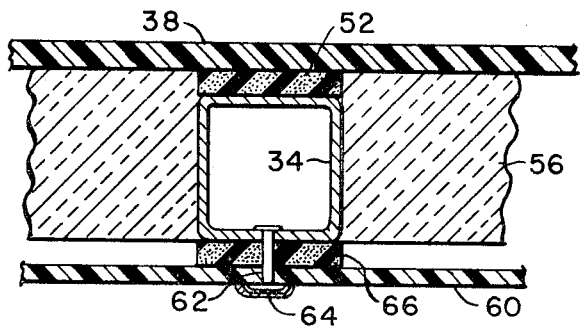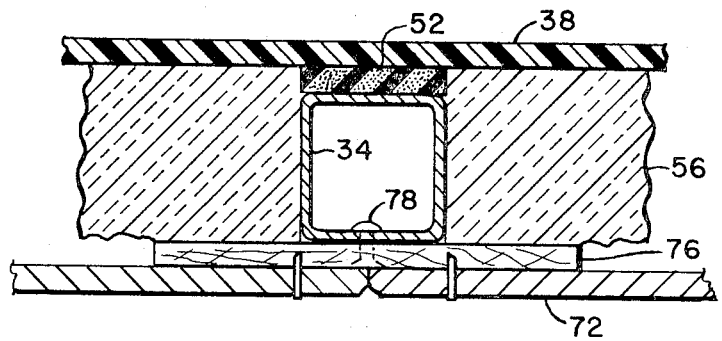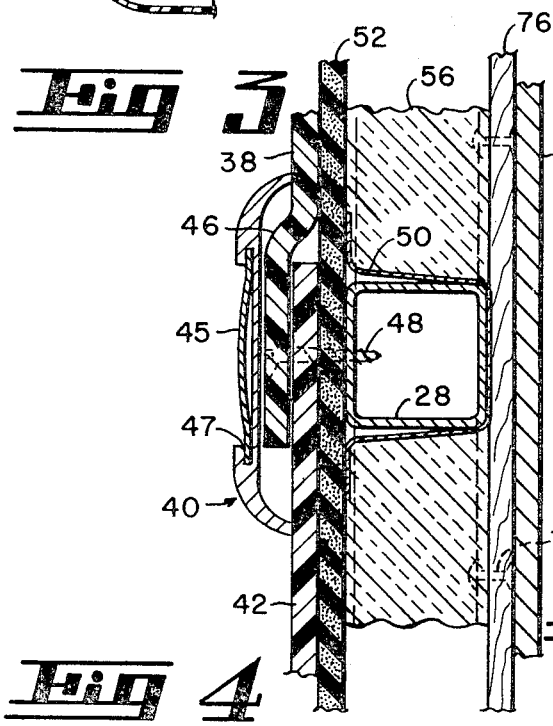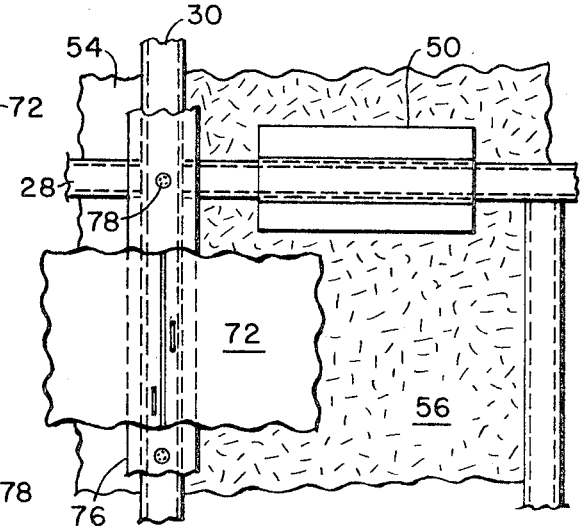

VEHICLE BODY CONSTRUCTION

The present invention relates to vehicle body construction and particularly to vehicle body construction for those types of vehicles which serve as temporary or permanent living quarters.

In recent years there have been a number of advances in body construction for recreational vehicles that have built-in living facilities. These advances have greatly enhanced the durability and comfort of this type of vehicle. An example of such an advance may be found in copending patent application Ser. No. 780,429, filed Dec. 2, 1968, entitled "Trailer Construction," in the name of R. F. McCollum and G. W. Ward, now U.S. Pat. No. 3,565,480 and of common assignment with the present invention. In that application there is shown a vehicle body construction comprising upper and lower reinforced glass fiber shells which have glass fiber reinforcing and a layer of foamed material around the insides of the shell for insulation. The lower shell is nestled over the chassis so that the body is greatly strengthened and able to withstand twisting and other dynamic stresses when the vehicle is moving along a road.

This type of body construction may be used for both trailer-type and self-propelled vehicles. However, in self-propelled vehicles which normally carry persons when the vehicle is in motion, it would be desirable to have an even greater strength, particularly to protect the vehicle occupants in the event of an accident which causes the vehicle to overturn. Accordingly, it is an object of the present invention to provide a vehicle body construction which has exceptional strength in addition to being durable and providing a high degree of comfort for the vehicle occupants.

In the broader aspects of the present invention the above ends are achieved by a vehicle body which has a frame. The frame is made up of a number of struts secured to one another to conform generally to the exterior shape of the vehicle body. A relatively thin shell is secured to the struts so that the outer side of the shell forms the exterior of the vehicle. The shell and struts cooperate to form a plurality of recesses on the inner side of the shell. A layer of rigid foamed material is positioned in each of the recesses. The foamed material adheres to the struts and shell so that the foamed material is structurally interconnected with the struts and shell.

The above and other related objects and features of the present invention will be apparent from a reading of the description of the disclosure found in the accompanying drawings and the novelty thereof pointed out in the appended claims.

In the drawings:

FIG. 2 is an enlarged portion of FIG. 1, particularly illustrating a feature of the present invention;

Figure 1:
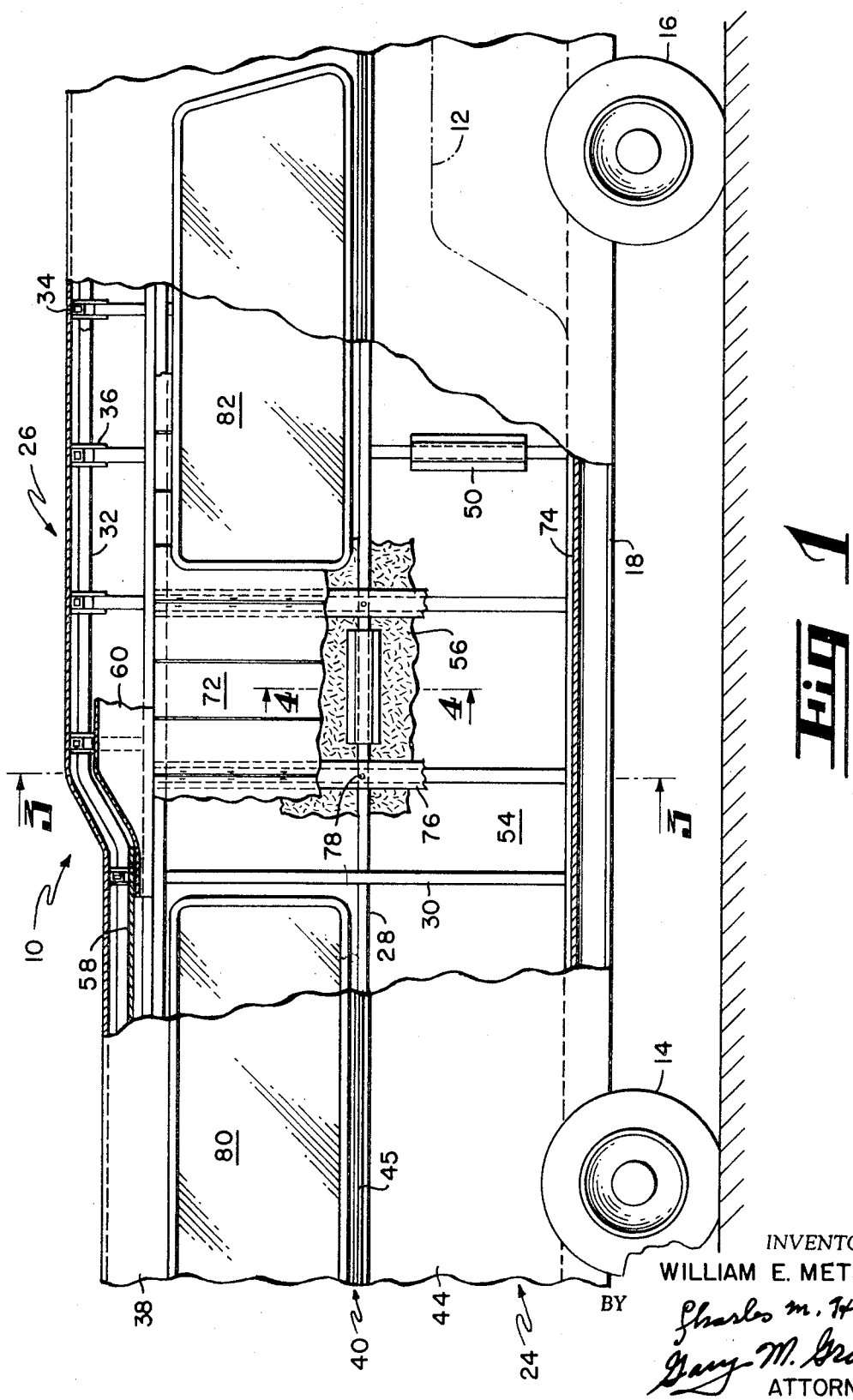
FIG. 1 is a fragmentary side view of a vehicle body embodying the present invention.

FIGS. 3 and 4 are fragmentary enlarged section views taken on lines 3—3 and 4—4, respectively, of FIG. 1;

FIGS. 5 and 6 are fragmentary enlarged section views taken on lines 5—5 and 6—6, respectively, of FIG. 3.

Referring to FIG. 1 there is shown a vehicle 10 with which the body construction embodying the present invention may be used. As illustrated, the vehicle 10 is the self-propelled type having an engine 12 (shown in phantom) which drives a rear wheel assembly 14 through a suitable transmission (not shown). A steerable front wheel assembly 16 is provided to guide the vehicle 10. A chassis 18 supports wheel assemblies 14 and 16 and provides a base for the vehicle 10. A frame comprises a series of struts which make up sides 22, 24 and a roof 26 (see particularly FIG. 3). The sides 22 and 24 have longitudinal and transverse struts 28, 30 respectively secured to one another as by welding. The frame is secured to chassis 18 by means of the transverse struts 30 (see FIG. 3). The roof 26 is comprised of longitudinal and transverse struts 32, 34 respectively. The transverse struts 34 have a pair of end plates 36 formed to the exterior curvature of the edge of roof 26. The plates 36 are secured to transverse struts 30 so that a series of roll bars are formed in the frame. The struts may be formed from a number of materials. As illustrated herein, however, the struts are tubular having a square-shaped cross section.

The vehicle 10 has an outer shell generally conforming to the outer shape of the frame and which defines the exterior shape of the body. While the shell may be formed from a number of suitable materials, it has been found that a glass fiber reinforced plastic is particularly suitable. The outer shell comprises an upper shell 38 extending across the roof 26 of the frame and down the sides 22, 24 to a waist band 40 extending around the sides 22, 24. As seen particularly in FIG. 3, the sides 22, 24 slightly converge toward their top and bottom from the waist band 40. A pair of lower shells 42, 44, respectively, cover the lower exterior of sides 22, 24. The upper shell 38 has an enlarged bottom edge 46 which overlaps the upper edges of lower shells 42, 44 (see FIG. 4).

The waist band 40 and shells 38, 42, 44 are secured to the frame by a series of screws 48 which extend to aligned transverse strut 28. A decorative strip 45, received in recesses 47, covers the screws 48. The shells are also secured to the frame by reinforced glass fiber fabric patches 50 which straddle the interior side of a strut and are cemented to the shell adjacent the strut. Resilient strips 52 are positioned between the outer shells and the frame. It has been found that a foamed vinyl with adhesive on the side facing the struts is particularly suitable.

The outer shells and the struts of the frame cooperate to form a series of recesses 54 on the inner side of the shells. All of these recesses are filled with an adhering, rigid foamed material 56, such as polyurethane, so that the struts, shells and foamed material are structurally interconnected.

The interior side of the roof 26 has a pair of ceiling panels 58 and 60 which extend between the sides 22 and 24. The ceiling panels 58, 60 are secured to the struts by rivets 62, having a vinyl cap 64 on the outer portion of the rivet (see FIG. 5). A number of resilient strips 66 are placed between the ceiling panels 58, 60 and the struts of the roof 26.

As shown in FIG. 3, the side edges of ceiling panel 60 have a radius $R_2$ greater than the radius $R_1$ of plates 36. This difference provides a raceway 68 in which an electrical wiring harness 70 may be placed.

The interior of sides 22, 24 are covered with a series of vertical panels 72 which extend from ceiling panels 58, 60 to a floor 74. The panels 72, as illustrated, are wood-grained panels commonly used for interior construction. The vertical panels 72 are secured to transverse struts 30 of the sides 22, 24 by stapling them to vertical strips 76 that are secured by rivets 78 to struts 30. The strips 76 provide a wider surface for the panels 72 to be attached but still enable the panels 72 to conform to the converging shape of sides 22, 24.

For a vehicle that is used to carry occupants, a number of windows 80, 82 may be provided for the admission of light.

The vehicle body described above has a high degree of strength for a minimum weight. By structurally tying together the frame, outer shell and foamed material the vehicle walls are highly resistant to twisting and lateral deformation during normal road use. The frame provides a high degree of protection for occupants of the vehicle and acts as a roll bar.

The strength of the vehicle is further enhanced by the interior ceiling panels 58, 60 and the vertical panels 72.

The convergence of the sides 22, 24 from the waist band 40 increases the strength of the vehicle by providing curved sidewalls. In addition, the convergence of the upper portion of walls 22, 24 provide a guide for the placing of the upper shell 38 on the frame.

Occupant comfort is enhanced by the vehicle body construction described above. Road noises are minimized by the foamed material 56. The foamed material additionally provides insulation for the interior of the vehicle. Squeaks are eliminated by the vinyl strips 52 which also act as a resilient slip plane between the outer shell and the frame which expand at a different rate.

The vehicle body construction described above is not limited to self-propelled vehicles. It may be used for trailer-type vehicles with equal advantage. While the preferred embodiment of the present invention has been shown, it is apparent that modifications may be made by those skilled in the art without departing from the present invention.

What is novel and desired to be secured by Letters Patent of the United States is:

1. A vehicle body comprising:
   a frame including a plurality of longitudinal and transverse struts secured to one another generally at right angles to conform generally to the exterior shape of the vehicle body;
   a relatively thin shell secured to said struts so that the outer side of said shell forms the exterior surface of the vehicle body, said shell and struts cooperating to form a plurality of generally rectangular recesses on the inner side of said shell;
   a layer of rigid foamed material positioned in each of said rectangular recesses and adhering to the struts and shell so that the foamed material is structurally interconnected with the struts and shells; and
   a resilient material intermediate the struts and outer shell.

2. A vehicle body as in claim 1 wherein said body has a roof and sides slightly converging toward the roof from a waist band around the sides and wherein said shell comprises:
   an upper shell conforming to the roof and the sides, said upper shell extending to said belt so that the sidewalls guide the upper shell onto the vehicle body;
   a pair of lower shells for opposite sides of said vehicle, the shells extending from said belt to the lower edge of the walls;
   said upper shell having a lower edge overlapping the upper edges of said lower shells.

3. A vehicle body as in claim 1 further comprising wall elements secured to said struts to form the interior walls of said vehicle body.

4. A vehicle body as in claim 3 wherein said body has a roof and sides wherein said body further comprises:
   ceiling panel means secured to the struts forming the roof of said body and extending from side to side to form an interior ceiling;
   a series of panels secured to the struts forming the sides of said body to form interior sidewalls.

5. A vehicle body as in claim 4 wherein said vehicle has a roof and sides slightly diverging toward the roof and bottom edge of the sides from a waist band around the sides, said struts generally conforming to the contour of the vehicle roof and sides, and wherein:
   said ceiling panel means comprises at least one panel extending across a major portion of said roof;
   said side panels comprise vertically extending panels; and
   said vehicle body further comprises a series of vertical strips positioned between the side panels and struts and having a width greater than the width of said struts for permitting greater variation in the securing and conforming of said vertical panels to the sides of said frame.

6. A vehicle body as in claim 5 wherein:
   the struts at the edge of the roof of said frame have a first radius of curvature generally conforming to the exterior shape of the roof of said vehicle body;
   the ceiling panel has a second greater radius of curvature at its edges so that an interior raceway for electrical wiring is formed around the edges of the roof of said vehicle body.

7. A vehicle body as in claim 5 for use with a self-propelled vehicle having a relatively rigid structural chassis forming a base for said vehicle and wherein said frame is structurally connected to said chassis.

8. A vehicle body as in claim 7 wherein:
   said frame includes a series of tubular elements having a square-shaped cross section,
   said unitary ceiling panel and said vertical strips are riveted to said tubular elements.

9. A vehicle body as in claim 8 wherein:
   said tubular elements are welded together to form the sides and roof of said frame;
   said outer shell is comprised of reinforced glass fibers;
   said resilient material comprises an expended vinyl strip;
   said foamed material is comprised of a rigid urethane foam.

* * * * *